US010723239B2

(12) United States Patent
Jordan, III et al.

(10) Patent No.: US 10,723,239 B2
(45) Date of Patent: Jul. 28, 2020

(54) MULTI-OUTLET VEHICLE CHARGE DEVICE AND CONTROL STRATEGY

(71) Applicant: Ford Global Technologies, LLC, Dearborn, MI (US)

(72) Inventors: Dale F. Jordan, III, Royal Oak, MI (US); Matthew Erich von der Lippe, Canton, MI (US); Jude Berthault, Ypsilanti, MI (US); Jeffrey Alan Palic, Canton, MI (US); Kenneth James Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 106 days.

(21) Appl. No.: 16/023,598

(22) Filed: Jun. 29, 2018

(65) Prior Publication Data
US 2020/0001724 A1 Jan. 2, 2020

(51) Int. Cl.
*H02J 7/00* (2006.01)
*B60L 53/66* (2019.01)
*B60L 53/14* (2019.01)
*B60L 53/65* (2019.01)
*B60L 58/12* (2019.01)

(52) U.S. Cl.
CPC ............. *B60L 53/665* (2019.02); *B60L 53/14* (2019.02); *B60L 53/65* (2019.02); *B60L 58/12* (2019.02); *H02J 7/0027* (2013.01); *B60L 2240/80* (2013.01)

(58) Field of Classification Search
USPC ........................................................ 320/109
See application file for complete search history.

(56) References Cited

U.S. PATENT DOCUMENTS

| | | | |
|---|---|---|---|
| 8,810,198 B2 * | 8/2014 | Nergaard | B60L 53/305 320/109 |
| 8,890,473 B2 | 11/2014 | Muller et al. | |
| 9,296,307 B2 | 3/2016 | Nosaka | |
| 9,685,798 B2 | 6/2017 | Appelbaum et al. | |
| 2011/0304304 A1 * | 12/2011 | Ankyu | H02J 7/0054 320/162 |
| 2015/0266389 A1 * | 9/2015 | Appelbaum | H02J 7/0027 320/138 |

* cited by examiner

*Primary Examiner* — Samuel Berhanu
(74) *Attorney, Agent, or Firm* — David Kelley; Brooks Kushman PC

(57) ABSTRACT

A vehicle charge station including charge cords and a controller is provided. Each of the charge cords may include an electrical connector to mate with a vehicle. The controller may be programmed to, responsive to detecting a first active one of the charge cords having a change in current draw greater than a second active one of the charge cords for a same time period, increase power provided to the first active one of the charge cords. The controller may be further programmed to, responsive to detecting the first active one of the charge cords having a continually active duration less than the second active one of the charge cords for another same time period, increase power provided to the first active one of the charge cords.

8 Claims, 3 Drawing Sheets

| | 202 Vehicle | 220 Priority Points | 224 Priority Position | 228 Allotted Current | 232 Utilized Current | 236 Passdown Current |
|---|---|---|---|---|---|---|
| 204 | First Vehicle | 500 | 1 | 48 | 45 | 3 |
| 206 | Second Vehicle | 450 | 2 | 30 | 33 | 0 |
| | Third Vehicle | 325 | 3 | 24 | 21 | 3 |
| 208 | Fourth Vehicle | 225 | 4 | 12 | 15 | 0 |
| | | | Total | 120 | 116 | |

US 10,723,239 B2

MULTI-OUTLET VEHICLE CHARGE DEVICE AND CONTROL STRATEGY

TECHNICAL FIELD

The present disclosure relates to a charge device and system for electrified vehicles.

BACKGROUND

Current vehicle charge devices and systems lack an acceptable efficiency for handling multiple electrified vehicles having varied states of charge. For example, the current vehicle charge devices and systems may not allocate power to respective vehicles in a manner to optimize a power source of the charge device and system in communication with the multiple electrified vehicles. It may not be economically feasible to include additional charge devices and systems to better optimize charge power.

SUMMARY

A vehicle charge station includes charge cords and a controller. Each of the charge cords includes an electrical connector to mate with a vehicle. The controller is programmed to, responsive to detecting a first active one of the charge cords having a change in current draw greater than a second active one of the charge cords for a same time period, increase power provided to the first active one of the charge cords. The controller may be further programmed to, responsive to detecting the first active one of the charge cords having a continually active duration less than the second active one of the charge cords for another same time period, increase power provided to the first active one of the charge cords. The controller may be further programmed to, responsive to detecting a first state of charge associated with a first vehicle mated with the first active one of the charge cords being less than a second state of charge associated with a second vehicle mated with the second active one of the charge cords, increase power provided the first active one of the charge cords. Each of the electrical connectors may include electronics to interface with a control unit of a vehicle to identify operating conditions of the vehicle. The controller may be further programmed to execute one of a variable charge algorithm or a priority algorithm. The algorithms may operate to identify a variable charge distribution to each of the electrical connectors based on an amount of time connected to the charge station, a price paid for access to the charge station, or a state of charge. The station may further include a power source in communication with the charge cords and the controller. The controller may be further programmed to direct the power source to variably output power to active ones of the charge cords according to a priority list defined by detected vehicle conditions.

A vehicle charge station includes charge cords and a controller. Each of the charge cords includes an electrical connector to mate with a vehicle. The controller is programmed to, responsive to detecting parameters describing power flow through active ones of the charge cords to corresponding vehicles, alter charge currents of the active ones of the charge cords to prioritize charging of the corresponding vehicles according to a predefined set of rules applied to the parameters. The controller may be further programmed to, responsive to data identifying some of the corresponding vehicles as having paid a fee to raise their priority, increase the charge currents of the some of the corresponding vehicles. The controller may be further programmed to output notices to users of the corresponding vehicles regarding changes to charge priority. The controller may be further programmed to prioritize charging of the corresponding vehicles according to order of vehicle arrival. The controller may be further programmed to prioritize charging of the corresponding vehicles according to state of charge data of the corresponding vehicles. The station may include an energy source in communication with the charged cords and the controller and may include a passdown current pool for storing passdown current allotted to a first vehicle but not used. The controller may be further programmed to direct the energy source to output the stored passdown current to a second vehicle.

A vehicle charge station includes charge cords and a controller. Each of the charge cords includes an electrical connector to mate with a vehicle. The controller is programmed to, responsive to detecting a first active one of the charge cords having a continually active duration less than a second active one of the charge cords for a same time period, increase power provided to the first active one of the charge cords. The controller may be further programmed to, responsive to detecting the first active one of the charge cords having a change in current draw greater than the second active one of the charge cords for another same time period, increase power provided to the first active one of the charge cords. The controller may be further programmed to, responsive to detecting a first state of charge associated with a first vehicle mated with the first active one of the charge cords being less than a second state of charge associated with a second vehicle mated with the second active one of the charge cords, increase power provided the first active one of the charge cords. The controller may be further programmed to estimate a state of charge (SOC) for each of a first vehicle connected to the first active one of the charge cords and a second vehicle connected to the second active one of the charge cords, to input the SOC values into a variable charge distribution algorithm to calculate a charge distribution output to the first vehicle and the second vehicle, and to output a charge command to direct an amount of charge to each of the first vehicle and the second vehicle based on the calculated charge distribution output. The controller may be further programmed to input detected vehicle arrival times and detected vehicle payment categories into a priority algorithm to identify a priority point value for each of the first vehicle and the second vehicle connected to one of the charge cords. The controller may be further programmed to output a charge command including a charge amount based on totals of the priority point values. The controller may be further programmed to detect additional current draws at spaced apart intervals and to update the SOC values input into the variable charge distribution algorithm to output subsequent charge commands based on changing SOC values at the spaced apart intervals. The controller may be further programmed to direct storage of passdown current allotted to the first vehicle but not used and to direct output of the stored passdown current to the second vehicle.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be used in particular applications or implementations.

Figure 1:
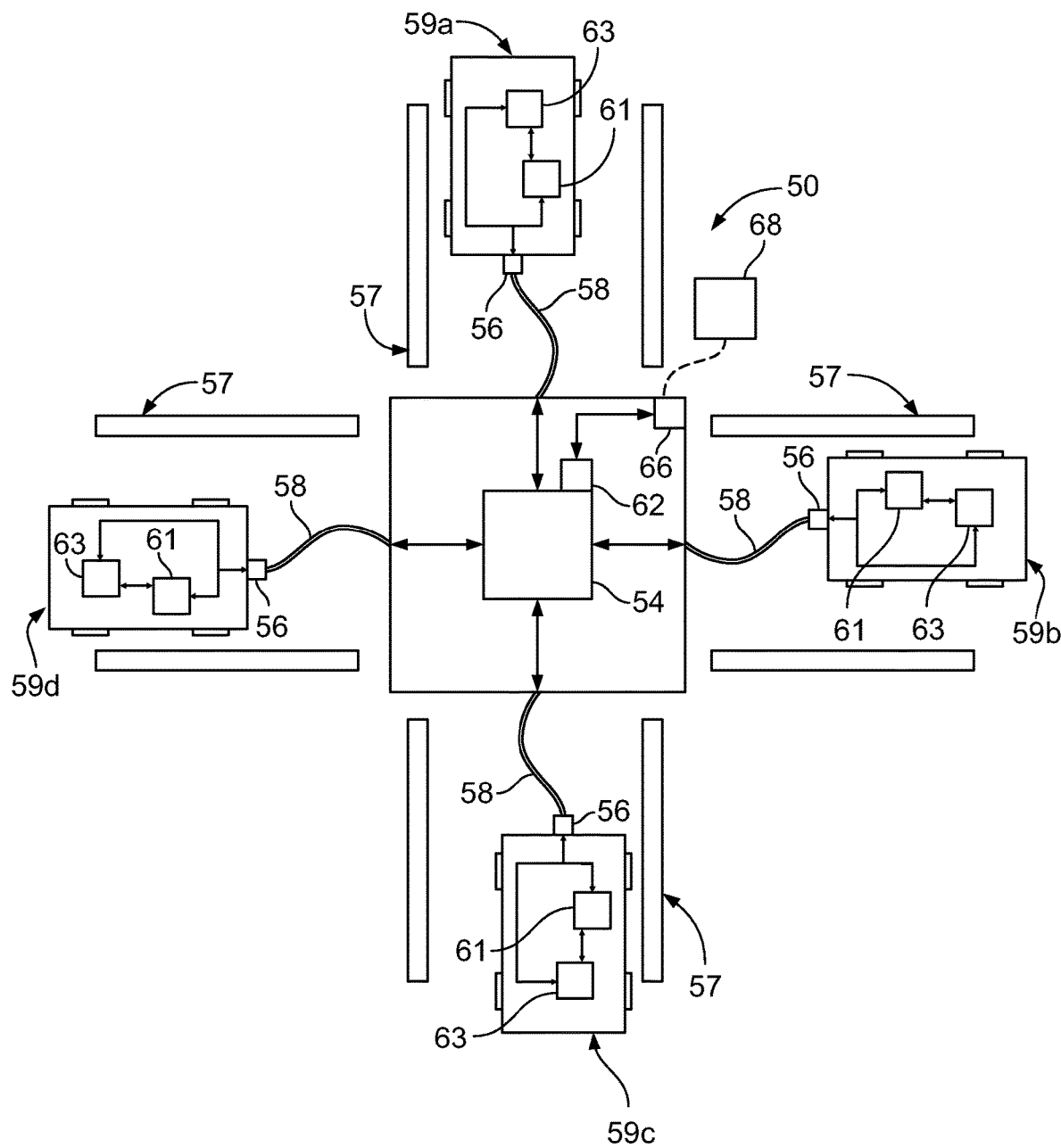
FIG. 1 is a block diagram illustrating an example of a vehicle charge device and system.

FIG. 1 is a block diagram illustrating an example of a charge device system for an electrified vehicle, referred to generally as a charge device 50. The charge device 50 may also be referred to as a charge station herein. The charge device 50 includes an energy source 54 in electrical communication with one or more connectors 56 to transfer energy thereto. The energy source 54 may be, for example, an interface between an electrical grid and the charge device 50 or an energy reservoir such as a battery.

The energy source 54 may include power conversion electronics to convert energy to an appropriate medium for electrified vehicles connected to the charge device 50. Each of the one or more connectors 56 may be a connector or plug for an electrified vehicle. For example, each of the one or more connectors 56 may be a high voltage plug. Each of the one or more connectors 56 may be accessible to connect to a vehicle parked in, for example, an adjacent parking space, such as one of a plurality of parking spaces 57. FIG. 1 illustrates an example with multiple electrified vehicles including a first vehicle 59a, a second vehicle 59b, a third vehicle 59c, and a fourth vehicle 59d. Each of the vehicles may include a vehicle controller 61 and a high voltage battery 63. Each of the vehicle controllers 61 may be in communication with components of a respective vehicle to transmit information and commands including communication with a respective high voltage battery 63. While four vehicles and four parking spaces 57 are shown in FIG. 1, it is contemplated that the charge device 50 may include an appropriate number of the one or more connectors 56 to operate with fewer or more vehicles.

Optionally, each of the one or more connectors 56 may be replaced with a wireless energy transfer unit to wirelessly transfer energy, for example via electromagnetic energy transfer, to an electrified vehicle including components to receive wireless energy transfer. One or more cables 58 may selectively transfer energy to a respective connector 56 for charging the electrified vehicle connected thereto. Each of the one or more cables 58 may also be referred to as a charge cord herein. Each of the one or more cables 58 may further transfer electrified vehicle signals relating to conditions of the connected vehicle obtained by the one or more connectors 56.

A charge device controller 62 may be electrically connected to the energy source 54 and each of the one or more connectors 56. The charge device controller 62 may receive signals from each of the one or more connectors 56 and selectively direct energy output by the energy source 54 to each of the one or more connectors 56 for charging respective vehicles connected thereto. For example, a respective one of the one or more connectors 56 may include electronics and programming to assist in obtaining or estimating a state of charge (SOC) of a high voltage battery of the electrified vehicle connected thereto and to send the SOC information to the charge device controller 62. In one example, the vehicle controller 61 of the respective vehicle may estimate a SOC of the respective high voltage battery 63 and provide the SOC information to the charge device controller 52. In another example, the charge device controller 62 may estimate a SOC of the respective vehicle based on an amount of charge initially flowing to the respective vehicle upon connection with the respective connector 56.

The charge device controller 62 may direct the energy source 54 to output energy to the respective one of the one or more connectors 56 based on the received information and algorithms included within the charge device controller 62 as further described below. Alternatively, the charge device controller 62 may estimate a SOC of a high voltage battery of the electrified vehicle connected thereto based on a high voltage battery trend graph and a detected charge amount flowing through a respective one or the one or more connectors 56.

As another example, each of the one or more connectors 56 may include electronics and programming to identify time events, to identify output voltages and currents from the charge device 50, to identify a minimal outputting power, and to communicate with the respective vehicle to identify vehicle operation conditions. Alternatively, the charge device controller 62 may be in communication with a transmitter/receiver 66 to wirelessly communicate with the respective vehicle. For example, the transmitter/receiver 66 may be connectable to a detected communication unit, such as a communication unit 68. The communication unit 68 may include electronics to communicate with the vehicle controller 61 of the respective vehicle to identify vehicle conditions related to recharging. The communication unit 68 may be onboard the respective vehicle or may be a mobile device of a passenger of the respective vehicle. In this example, the mobile device may be connectable to the vehicle controller 61 to obtain information relating to vehicle conditions and to transmit the information to the charge device controller 62 via the transmitter/receiver 66.

The charge device controller 62 may include programming to direct a variable distribution of charge based on identified or predetermined conditions. For example, a variable distribution algorithm may operate to identify the variable distribution of the charge based on a function of each electrified vehicle's change in current draw (to identify a delta to 100% SOC), an amount of time since plug-in, and other priority factors. In response to receipt of signals including the identified or predetermined conditions, the charge device controller 62 may direct the energy source 54 to output variable charge amounts to each of the respective vehicles via the one or more connectors 56.

For example, the charge device controller 62 may communicate with one or more electrified vehicles each connected to one of the one or more connectors 56. The charge device controller 62 may obtain SOC information relating to the high voltage batteries 63 of each electrified vehicle connected to the one of the one or more connectors 56. These SOC values may then be input into an algorithm, such as the variable distribution algorithm, to identify an amount of charge for distribution to each of the vehicles. Further, the charge distribution algorithm may be updated with an amount of charge for distribution to each vehicle based on continuously updated SOC values received for each of the electrified vehicles and based on vehicles arriving or departing the charge device 50. In one example, the variable distribution algorithm may output the amounts of charge for distribution based on arrival times of the vehicles to the charge device 50. In this example, a first vehicle arriving to the charge device 50 prior to arrival of a second vehicle may receive a greater distribution of an amount of charge from the charge device 50.

In another example, the charge device controller 62 may include a priority algorithm to identify a priority of charge distribution to the one or more vehicles connected to the charge device 50. The priority algorithm may assign values and thus a priority to each of the one or more vehicles based on detected vehicle conditions as further described below. Examples of detected vehicle conditions include an amount of time connected to the charge device 50, a price paid for access to the charge device 50, and an SOC of the vehicle connected to the charge device 50.

Figure 2:
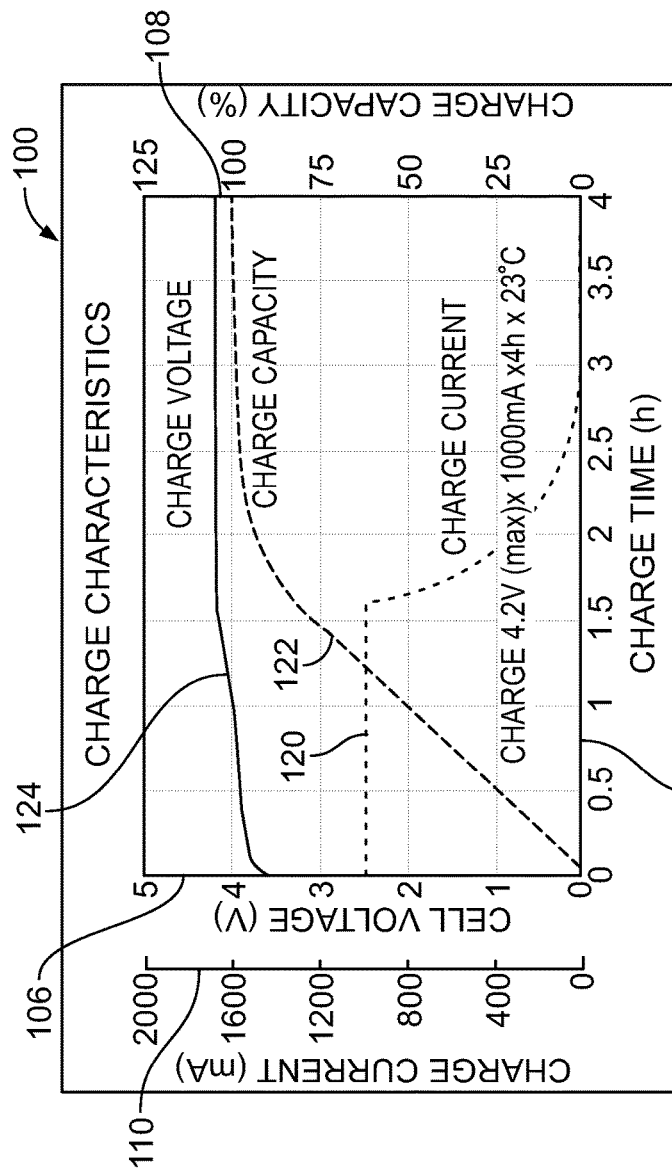
FIG. 2 is a graph illustrating an example of charge characteristics of a vehicle high voltage battery cell.

FIG. 2 is a graph illustrating an example of charge characteristics of a vehicle battery cell, referred to generally as a trend graph 100. An X-axis 104 represents a charge time in hours. A first Y-axis 106 represents a battery cell voltage in volts. A second Y-axis 108 represents a battery cell charge capacity in percent. A third Y-axis 110 represents a charge current in milliamperes. A first plot 120 represents a charge current for an example of a high voltage battery cell. A second plot 122 represents a charge capacity for the example of the high voltage battery cell. A third plot 124 represents a charge voltage of the example of the high voltage battery cell.

Each of the first plot 120, the second plot 122, and the third plot 124 illustrate example charge characteristics for the example high voltage battery cell. Trends shown in the trend graph 100 may be generally applicable to other examples of high voltage battery cells. With regard to the first plot 120, the second plot 122, and the third plot 124, a charge current supplied to the example high voltage battery cell drops after approximately 1.6 hours pass, the charge capacity is approximately equal to 80%, and the charge voltage is equal to approximately 4.2 volts. Based on the trends of the trend graph 100, the charge device controller 62 may estimate a SOC of the respective high voltage battery connected thereto. This estimated SOC may then be input into one of the algorithms described herein to identify an amount of charge distribution to the respective high voltage battery.

Figure 3:
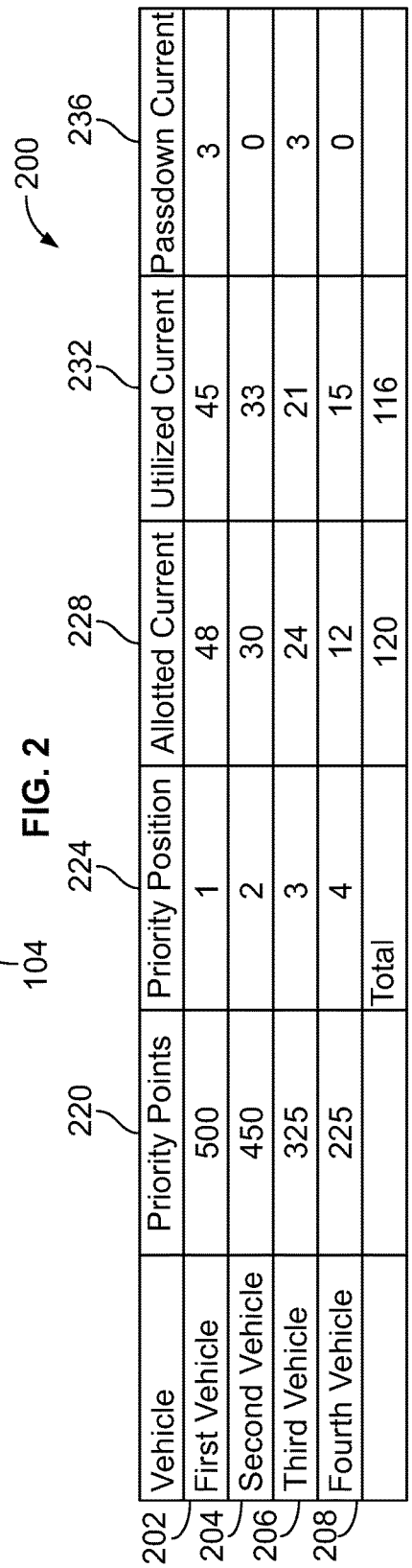
FIG. 3 is a chart illustrating an example of a vehicle priority list calculated based on detected vehicle conditions.

FIG. 3 is a chart illustrating an example of a vehicle priority list based on detected vehicle conditions and algorithm calculation(s), referred to generally as a priority chart 200. Row 202 relates to a first vehicle, row 204 relates to a second vehicle, row 206 relates to a third vehicle, and row 208 relates to a fourth vehicle. Column 220 relates to a total of priority points obtained by a respective vehicle, column 224 relates to a vehicle priority position based on accumulated priority points, column 228 relates to an amount of allotted current from an energy source, column 232 relates to an amount of utilized current from the energy source, and column 236 relates to a passdown current value.

A controller, such as the charge device controller 62, may include programming and algorithms to create the priority chart 200 based on detected conditions of vehicles in electrical communication with a charge device, such as the charge device 50. For example, a value may be identified and associated with each of the vehicles connected to the charge device based on detected vehicle conditions. Each of the values identified for each of the vehicles may be added together separately to arrive at a priority point value for column 220 to determine each respective vehicle's priority position in column 224.

In the example illustrated in FIG. 3, the first vehicle is assigned a priority point value of 500, the second vehicle a priority point value of 450, the third vehicle a priority point value of 325, and the fourth vehicle a priority point value of 225.

In one example, an equation for identifying a value of the priority points of column 220 may be illustrated as follows:

$$\{A*[(\text{order of arrival})-(\text{number of charge device connectors})]+B*[(\text{current charging current/peak charging current})^2]\}*[C*(\text{priority level based on a fee payment category})]$$

A, B, and C may be scalars which may be adjusted to vary a weight of each vehicle condition relative to identified charge distributions. The priority chart 200 relates to a charge device having a maximum output of 120 A for charging vehicles (see total identified in Column 228). Allotted current values of 48, 30, 24, and 12 are shown in column 228 while utilized current values of 45, 33, 21, and 15 are shown in column 232. Passdown current values of 3, 0, 3, and 0 are shown in column 236. These passdown current values represent a delta in an amount of charge allotted for a vehicle in comparison to an amount of charge utilized by the vehicle. For example, the first vehicle is assigned an allotted current of 48 A in column 228 but is only utilizing 45 A as shown in column 232 thus resulting in a passdown current value of 3 A. The passdown current value of 3 A may be stored in a pool for access by the other vehicles. Use of the passdown current pool may assist in promoting a more efficient operating strategy for the charge device 50 as power identified as not being used or excess may be utilized by other vehicles connected to the charge device 50. Optionally, the pool of passdown current may have accessible energy stored therein for use by vehicles connected to the charge device 50.

The priority point value of column 220 may be calculated by the priority algorithm and based on vehicle conditions such as a vehicle arrival order, a vehicle SOC, and a fee payment category. The priority algorithm may detect conditions of the vehicles connected to the charge device and calculate point values associated with the detected conditions. For example, the vehicle arrival order may translate to 200 points for a first arrival, 150 points for a second arrival, 100 points for a third arrival, and 50 points for a fourth arrival. A detected or estimated vehicle traction battery SOC may translate to 200 points for a SOC of 0% to 25%, 150 points for a SOC of 26% to 50%, 100 points for a SOC of 51% to 75%, and 50 points for a SOC of 76% to 100%. A SOC of 75% to 100% may be identified as a vehicle in a trickle charge phase. Vehicles identified as in the trickle charge phase may receive negative priority points to reduce a total priority point value such that other vehicles with less SOC receive a greater amount of charge. The fee payment categories may include an economic category translating to 25 points, a standard category translating to 75 points, and a premium category translating to 100 points. Each of the fee payment categories may be associated with a different payment in which the premium category is greater than the standard category which is greater than the economic category.

In this example, the first vehicle arrives first, has a SOC between 0% and 25%, and has paid for inclusion in the premium category, equating to a priority point total of 500. The second vehicle arrives second, has a SOC between 0% and 25%, and has paid for inclusion in the premium category, equating to a priority point total of 450. The third vehicle arrives third, has a SOC between 26% and 50%, and has paid for inclusion in the standard category, equating to a priority point total of 325. The fourth vehicle arrives fourth, has a SOC between 51% and 75%, and has paid for inclusion in the standard category, equating to a priority point total of 225.

Based on the priority point totals, the controller may allocate 48 A of current for the first vehicle, 30 A of current for the second vehicle, 24 A of current for the third vehicle, and 12 A of current for the fourth vehicle as shown in column 228. Each of the vehicles may utilize an amount of the allotted current as indicated in column 232. A delta between the allotted current and the utilized current is represented in column 236 and identified as passdown current for the passdown current pool accessible by vehicles connected to the charge device 50 to promote efficient operation of the charge device 50.

Figure 4:
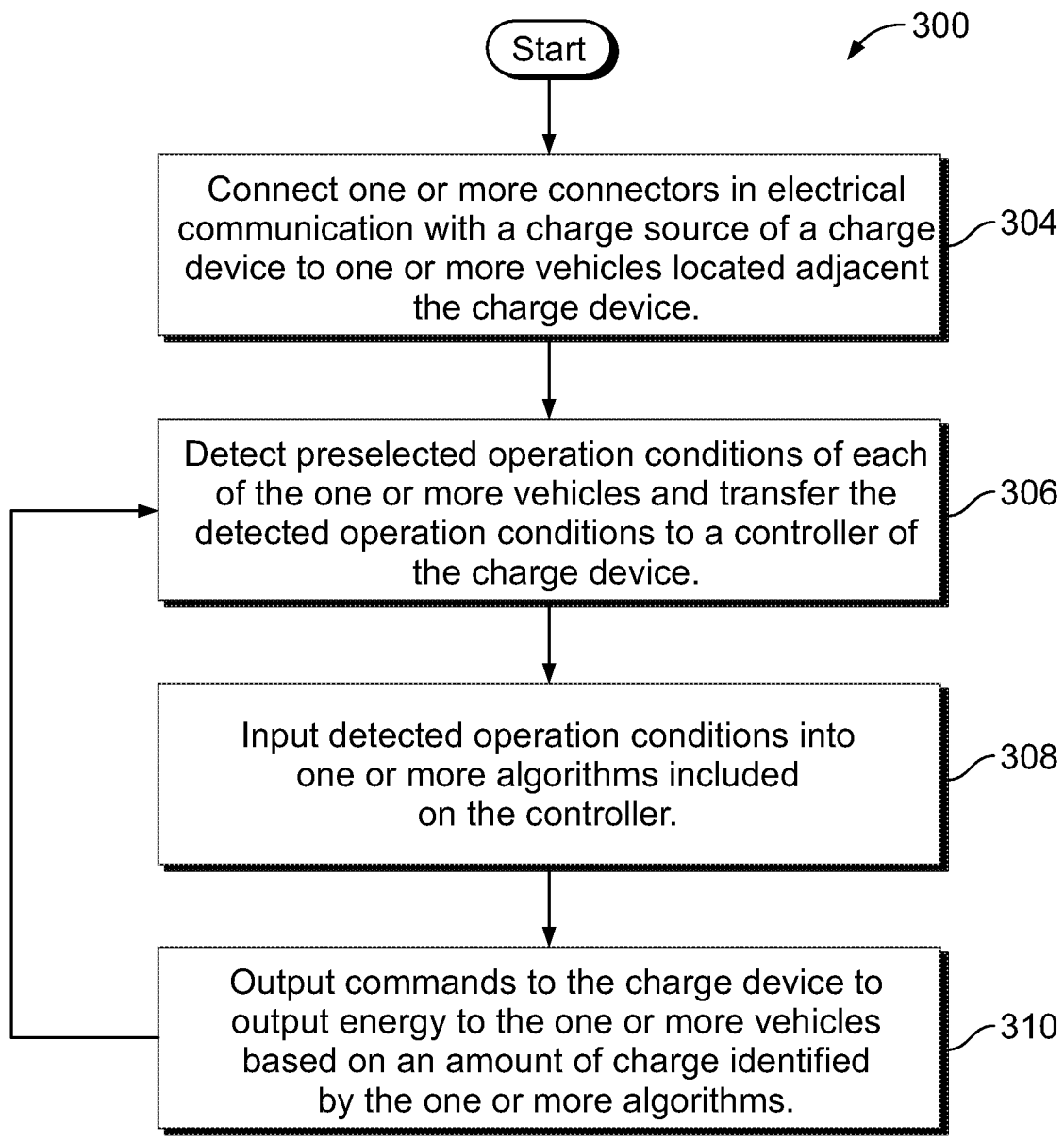
FIG. 4 is a flow chart illustrating an example of a portion of a control strategy for a vehicle charge device.

FIG. 4 is a flow chart illustrating an example of a control strategy for a vehicle charge device, referred to generally as a control strategy 300. A controller, such as the charge device controller 62, may use the control strategy 300 to identify a distribution of charge from a charge device, such as the charge device 50, to a vehicle connected thereto. In operation 304, one or more connectors of the charge device may be connected to a corresponding one or more vehicles parked adjacent the charge device. For example, the one or more connectors 56 in electrical communication with the energy source 54 and the charge device controller 62 may be connected to one of the vehicles parked in one of the plurality of parking spaces 57.

In operation 306, the controller may identify values for preselected operation conditions of each of the one or more vehicles. For example, the controller may access each of the one or more vehicles by connecting the one or more connectors thereto. The controller may access or detect, for example, information relating to a vehicle SOC, a charge station arrival time, a price paid for access to the charge device, a loyalty program, or other preselected operation conditions. The controller may further access or detect the information in subsequent operations to provide updated direction on charge output based on, for example, a changed vehicle SOC or arrival/departure times of other vehicles. The controller may send a notice to a user device, such as an onboard vehicle computer or a mobile device, indicating a change in the vehicle priority designation. For example, a first vehicle connected to the charge device may have accumulated a priority point total sufficient to be a first priority. Subsequently, a second vehicle may connect with the charge device at a later time and accumulate a priority point total greater than the priority point total of the first vehicle. In this example, the controller may send a notice to a user device indicating the change in priority and offering an option to increase a fee amount to remain as the first priority.

In operation 308, the accessed or detected information may be input into the controller including one or more algorithms. The one or more algorithms may calculate an amount of a distribution of charge from the energy source to the one or more vehicles connected to the charge device. For example, the one or more algorithms may include a variable distribution algorithm and/or a priority algorithm. The variable distribution algorithm and the priority algorithm may operate together to identify an amount of charge to distribute from the energy source or may operate individually and separately.

The variable distribution algorithm may calculate an amount of charge to distribute to each of the vehicles connected to the charge device based on, for example, a detected or estimated SOC, an amount of time passed since a respective vehicle connected to the charge device, and a vehicle arrival hierarchy. The priority algorithm may calculate the priority point values discussed above based on detected conditions of respective vehicles connected to the charge device.

In operation 310, the controller may output commands to the charge device to variably output an amount of charge to each of the vehicles in electrical communication with the energy source based on the calculations of the one or more algorithms. The control strategy 300 may operate to continuously interact with vehicles connected to the charge device to output updated charge distribution commands. For example, following operation 310, the control strategy 300 may return to operation 306 to obtain updated information relating to conditions of the vehicles connected to the charge device. The return to operation 306 may be based on, for example, a predetermined amount of time passing or detection of one or more triggering events, such as an arrival of another vehicle.

Optionally, the charge device may increase or decrease an amount of charge output by using the passdown current pool as described above.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle charge station comprising:
    charge cords each including an electrical connector to mate with a vehicle; and
    a controller programmed to,
        responsive to detecting a first vehicle being mated with a first active one of the charge cords and a second vehicle being mated with a second active one of the charge cords, calculate a priority score for each of the first and second vehicles based on duration of connection, state of charge, and price paid to access the charge station, responsive to the priority score of the first vehicle being greater than the priority score of the second vehicle, send a notice to a user device associated with the second vehicle indicating a lower priority score for the second vehicle and an option to increase the priority score for the second vehicle by payment of additional fees, and responsive to payment of the additional fees, allocate more charging current to the second vehicle than to the first vehicle, otherwise allocate more charging current to the first vehicle than to the second vehicle.

2. The station of claim 1, wherein the controller is further programmed to, responsive to detecting the first active one of the charge cords having a continually active duration less than the second active one of the charge cords for a same time period, increase power provided to the first active one of the charge cords.

3. The station of claim 1, wherein the controller is further programmed to, responsive to detecting a first state of charge associated with the first vehicle being less than a second state of charge associated with the second vehicle mated, increase power provided to the first active one of the charge cords.

4. The station of claim 1, wherein the electrical connectors each include electronics to interface with a vehicle control unit to identify vehicle operating condition.

5. A vehicle charge station comprising:

charge cords each including an electrical connector to mate with a vehicle; and a controller programmed to responsive to detecting parameters describing power flow from a power source through active ones of the charge cords to corresponding vehicles, alter charge currents of the active ones of the charge cords to prioritize charging of the corresponding vehicles according to a predefined set of rules applied to the parameters, wherein the predefined set of rules reflect calculation of a priority score based on parameters including duration of connection, state of charge, and price paid to access to the charge station, responsive to detecting the priority score of a first vehicle becoming less than the priority score of a second vehicle, send a notice to a user device associated with the first vehicle indicating an option to increase the first priority score by payment of additional fees, and responsive to payment of the additional fees, allocate more charging current from the power source to the first vehicle than to the second vehicle, otherwise allocate more charging current from the power source to the second vehicle than to the first vehicle.

6. The station of claim 5 further comprising a passdown current pool configured to store power from the power source allotted to the first vehicle but not supplied to the first vehicle, wherein the controller is further programmed to output the power stored by the passdown current pool to the second vehicle.

7. A method for operating a charge station comprising:

by a controller, responsive to detecting a first vehicle being mated with a first active one of a plurality of charge cords of the charge station and a second vehicle being mated with a second active one of the plurality of charge cords of the charge station, calculating a priority score for each of the first and second vehicles, responsive to the priority score of the first vehicle being greater than the priority score of the second vehicle, sending a notice to a user device associated with the second vehicle indicating a lower priority score for the second vehicle and an option to increase the priority score for the second vehicle by payment of additional fees, and responsive to payment of the additional fees, allocating more charging current from a power source to the second vehicle than to the first vehicle, otherwise allocating more charging current from the power source to the first vehicle than to the second vehicle.

8. The method of claim 7 further comprising, outputting power stored by a passdown current pool to the second vehicle, wherein the passdown current pool is configured to store power from the power source allotted to the first vehicle but not supplied to the first vehicle.

* * * * *